(12) United States Patent
Stuart et al.

(10) Patent No.: US 9,141,270 B1
(45) Date of Patent: Sep. 22, 2015

(54) SMART SCROLLER USER INTERFACE ELEMENT

(71) Applicant: ALLSCRIPTS SOFTWARE, LLC, Chicago, IL (US)

(72) Inventors: Anthony Edward Stuart, Wake Forest, NC (US); Leigh Randal McClure, Knightdale, NC (US)

(73) Assignee: ALLSCIPTS SOFTWARE, LLC, Chicago, IL (US)

( * ) Notice: Subject to any disclaimer, the term of this patent is extended or adjusted under 35 U.S.C. 154(b) by 210 days.

(21) Appl. No.: 13/972,615

(22) Filed: Aug. 21, 2013

Related U.S. Application Data

(60) Provisional application No. 61/732,321, filed on Dec. 1, 2012.

(51) Int. Cl.
*G06F 3/033* (2013.01)
*G06F 3/0485* (2013.01)
*G06F 3/0481* (2013.01)
*G06F 17/22* (2006.01)
*G06F 3/0354* (2013.01)

(52) U.S. Cl.
CPC ............ *G06F 3/0485* (2013.01); *G06F 3/0481* (2013.01); *G06F 3/03547* (2013.01); *G06F 17/2241* (2013.01)

(58) Field of Classification Search
CPC . G06F 3/04855; G06F 3/017; G06F 17/2241; G06F 3/0481
USPC .......................................... 715/863, 782, 786
See application file for complete search history.

(56) References Cited

U.S. PATENT DOCUMENTS

| | | | |
|---|---|---|---|
| 5,867,158 A | 2/1999 | Murasaki et al. | |
| 6,157,381 A * | 12/2000 | Bates et al. | 715/786 |
| 6,816,174 B2 * | 11/2004 | Wu et al. | 715/787 |
| 8,806,380 B2 * | 8/2014 | Moon et al. | 715/856 |
| 8,954,889 B2 * | 2/2015 | Fujibayashi | 715/833 |
| 2002/0109728 A1 * | 8/2002 | Tiongson et al. | 345/786 |
| 2003/0043174 A1 | 3/2003 | Hinckley et al. | |
| 2003/0193524 A1 * | 10/2003 | Bates et al. | 345/786 |
| 2005/0138570 A1 * | 6/2005 | Good et al. | 715/789 |
| 2006/0036942 A1 * | 2/2006 | Carter | 715/526 |
| 2006/0184901 A1 * | 8/2006 | Dietz | 715/855 |

(Continued)

OTHER PUBLICATIONS

Information Disclosure Statement (IDS) Letter Regarding Common Patent Application(s) dated May 5, 2015.
Adobe User Manual NPL reference in U.S. Appl. No. 13/842,989.

*Primary Examiner* — Linh K Pham
(74) *Attorney, Agent, or Firm* — Tillman Wright, PLLC; Chad D. Tillman; Jeremy C. Doerre

(57) ABSTRACT

A navigational user interface element includes a navigational bar displaying thereon labels associated with a plurality of sections, and a highlight indicating a section of a page that a user is currently viewing. The navigational user interface element is configured to allow a user to click on the highlight and drag it to effect navigation to a section associated with a displayed label. The navigational user interface element is configured to, when the highlight is clicked and dragged and then released, snap the highlight to the section label the highlight is closest to when the highlight is released, and display that same section. The navigational user interface element is configured to, when a label is clicked, effect navigation to the section corresponding to that label.

20 Claims, 14 Drawing Sheets

(56) References Cited

U.S. PATENT DOCUMENTS

| | | |
|---|---|---|
| 2010/0077353 A1* | 3/2010 | Moon et al. .................. 715/832 |
| 2012/0023438 A1* | 1/2012 | Xia et al. ..................... 715/783 |
| 2013/0132892 A1* | 5/2013 | Lentz et al. .................. 715/786 |
| 2015/0012813 A1* | 1/2015 | Naderi ......................... 715/234 |
| 2015/0012877 A1* | 1/2015 | Lee et al. ..................... 715/786 |

* cited by examiner considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the

Prior Art

*FIG. 1*

| 12-Jan-2012 | Office Visit ▼ | Status: Unsigned | Owner: Dr. John Smith | Last Saved: 1:15:03 PM |

CC

Medical History

HPI

Active Problems
Type II Diabetes Mellitus (250.00) – w/o mention of complication or manifestation; type II, controlled
Managed by – SMITH, John MD | Onset Date – 16-May-2008
Hypertension (401.0) – Essential hypertension; malignant
Seasonal Allergic Reaction (477.0) – Allergic rhinitis, due to pollen, Pollinosis Hx

Current Medications
Accuretic 25-20 mg Oral Tablet; 1 PO QD
Metformin 1000 mg; 1 PO BID
Lantus 20 Units; qH S

ROS

Allergies
Cephalosporins
Eggs

Vitals

Immunizations
Tetanous

PE

Family History

Results

Social History

A&P

Past Medical History
Cholecystitis
Acute Sinusitis

Review of Systems

*FIG. 2*

| 12-Jan-2012 | Office Visit ▾ | Status: Unsigned | Owner: Dr. John Smith | Last Saved: 1:15:03 PM |

Medical History

Active Problems
Type II Diabetes Mellitus (250.00) – w/o mention of complication or manifestation; type II, controlled
Managed by – SMITH, John MD | Onset Date – 16-May-2008
Hypertension (401.0) – Essential hypertension; malignant
Seasonal Allergic Reaction (477.0) – Allergic rhinitis, due to pollen, Pollinosis

Current Medications
Accuretic 25-20 mg Oral Tablet; 1 PO QD
Metformin 1000 mg; 1 PO BID
Lantus 20 Units; qH S

Allergies
Cephalosporins
Eggs

Immunizations
Tetanous

Family History

Social History

Past Medical History
Cholecystitis
Acute Sinusitis

*FIG. 3*

Barton, Jason Jr. (Mr.) ▾ (MSSP)
August 17, 1950 (63y) | Sex M | MRN 933145526

DR. FRANK BLACK ▾

Bio

HPI

Hx

ROS

Vitals

PE

Results

Medical History

Active Problems
Type II Diabetes Mellitus (250.00) – w/o mention of complication or manifestation; type II, controlled
Managed by – SMITH, John MD | Onset Date – 16-May-2008
Hypertension (401.0) – Essential hypertension; malignant
Seasonal Allergic Reaction (477.0) – Allergic rhinitis, due to pollen, Pollinosis

Current Medications
Accuretic 25-20 mg Oral Tablet; 1 PO QD
Metformin 1000 mg; 1 PO BID
Lantus 20 Units; qH S

Allergies
Cephalosporins
Eggs

Immunizations
Tetanous

Past Medical History
Cholecystitis
Acute Sinusitis

Review of Systems

SMART SCROLLER USER INTERFACE ELEMENT

CROSS-REFERENCE TO RELATED APPLICATIONS

The present application is a U.S. nonprovisional patent application of, and claims priority under 35 U.S.C. §119(e) to, U.S. provisional patent application Ser. No. 61/732,321, filed Dec. 1, 2012, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to navigational user interface elements.

It is common to have more text, data, or information than will fit on a display screen at one time. One conventional approach to resolve this issue is to allow a user to scroll up or down a page or screen. FIG. 1 illustrates a conventional scrollbar which can be utilized for this purpose. However, a need exists for improvement in user interface elements facilitating the display, entry, or editing of data. This, and other needs, are addressed by one or more aspects of the present invention.

SUMMARY OF THE INVENTION

The present invention includes many aspects and features. Moreover, while many aspects and features relate to, and are described in, the context of healthcare, the present invention is not limited to use only in this context, as will become apparent from the following summaries and detailed descriptions of aspects, features, and one or more embodiments of the present invention.

Accordingly, one aspect of the present invention relates to a navigational user interface element. The navigational user interface element includes a navigational bar displaying thereon labels associated with a plurality of sections, the labels being displayed generally equidistant from one another; a highlight indicating a section of a page that a user is currently viewing; wherein the navigational user interface element is configured to allow a user to click on the highlight and drag it to effect navigation to a section associated with a displayed label; wherein the navigational user interface element is configured to, when the highlight is clicked and dragged and then released, snap the highlight to the section corresponding to the label the highlight is closest to when the highlight is released, and display that same section; and wherein the navigational user interface element is configured to, when a label is clicked, effect navigation to the section corresponding to that label and display the section in an editing mode.

Another aspect relates to a computer readable medium containing computer executable instructions for implementing a navigational user interface element.

Another aspect relates to a computer readable medium containing computer executable instructions for implementing a disclosed method.

Another aspect relates to a method of using a navigational user interface element.

Another aspect relates to a method comprising displaying, to a user via a touchscreen associated with an electronic device, a graphical user interface comprising a display pane containing content, the content including a plurality of sections, a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element; determining, at the electronic device, that content corresponding to a first section of the plurality of sections is being displayed in the display pane, effecting, at the electronic device based on the determination that content corresponding to the first section of the plurality of sections is being displayed in the display pane, highlighting of a first section label of the navigational user interface element corresponding to the first section of the plurality of sections; receiving, from the user via the touchscreen, input corresponding to swiping of the screen at an area associated with the display pane; effecting scrolling, based on the received input corresponding to swiping of the screen at an area associated with the display pane, of the content displayed in the display pane; determining, following the scrolling of the content displayed in the display pane, that content corresponding to a second section of the plurality of sections is being displayed in the display pane; effecting, at the electronic device based on the determination that content corresponding to the second section of the plurality of sections is being displayed in the display pane, transitioning of the highlight to a second section label of the navigational user interface element corresponding to the second section of the plurality of sections; receiving, from the user via the touchscreen, input corresponding to tapping of the screen at an area associated with a third section label of the navigational interface element; effecting display, in the display pane based on the received input corresponding to tapping of the screen at an area associated with a third section label, of content associated with a third section of the plurality of sections corresponding to the third section label; effecting, at the electronic device, transitioning of the highlight to the third section label of the navigational user interface element; receiving, from the user via the touchscreen, input corresponding to pressing and holding on top of the highlight of the navigational user interface element, and dragging of the highlight away from the third section label and towards a fourth section label; displaying, via the touchscreen in response to input corresponding to tapping and holding on top of the highlight of the navigational user interface element, movement of the highlight as the user drags the highlight; receiving, from the user via the touchscreen, input corresponding to release of the press and hold at a position between fourth and fifth section labels that is closer to the fourth section label than the fifth section label; determining, at the electronic device, that the position at which the tap and hold was released is closest to the fourth section label; effecting display, in the display pane based on the determination that the position at which the tap and hold was released is closest to the fourth section label, of content associated with a fourth section of the plurality of sections corresponding to the fourth section label; and effecting, at the electronic device, transitioning of the highlight to the fourth section label of the navigational user interface element.

In one or more preferred implementations in accordance with one or more aspects, an electronic device comprises a tablet computer.

In one or more preferred implementations in accordance with one or more aspects, an touchscreen comprises a touchscreen monitor.

In one or more preferred implementations in accordance with one or more aspects, an electronic device comprises a smartphone.

In one or more preferred implementations in accordance with one or more aspects, an electronic device comprises a laptop.

In one or more preferred implementations in accordance with one or more aspects, an electronic device comprises a phone.

In one or more preferred implementations in accordance with one or more aspects, an electronic device comprises a desktop computer.

In one or more preferred implementations in accordance with one or more aspects, an electronic device comprises a workstation.

In one or more preferred implementations in accordance with one or more aspects, content comprises medical data.

In one or more preferred implementations in accordance with one or more aspects, content comprises patient medical data.

In one or more preferred implementations in accordance with one or more aspects, the first section and the third section are the same section.

In one or more preferred implementations in accordance with one or more aspects, the first section and the third section are different sections.

In one or more preferred implementations in accordance with one or more aspects, the second section and the fourth section are the same section.

In one or more preferred implementations in accordance with one or more aspects, the second section and the fourth section are different sections.

In one or more preferred implementations in accordance with one or more aspects, the first section and the fourth section are the same section.

In one or more preferred implementations in accordance with one or more aspects, the first section label and the fifth section label are the same section label.

In one or more preferred implementations in accordance with one or more aspects, one or more of the first section label, second section label, third section label, fourth section label, and fifth section label refer to the same section label.

In one or more preferred implementations in accordance with one or more aspects, the first section label, second section label, third section label, fourth sectional label, and fifth section label all refer to different section labels.

Another aspect relates to a method comprising displaying, to a user via a touchscreen associated with an electronic device, a graphical user interface comprising a display pane containing content, the content including a plurality of sections, a scrollbar interface element configured to allow a user to scroll the content displayed in the display pane up and down to view each of the plurality of sections of the content, a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element; determining, at the electronic device, that content corresponding to a first section of the plurality of sections is being displayed in the display pane, effecting, at the electronic device based on the determination that content corresponding to the first section of the plurality of sections is being displayed in the display pane, highlighting of a first section label of the navigational user interface element corresponding to the first section of the plurality of sections; receiving, from the user via the touchscreen, input corresponding to scrolling of the content displayed in the display pane; effecting scrolling, based on the received input corresponding to scrolling of the content displayed in the display pane, of the content displayed in the display pane; determining, following the scrolling of the content displayed in the display pane, that content corresponding to a second section of the plurality of sections is being displayed in the display pane; effecting, at the electronic device based on the determination that content corresponding to the second section of the plurality of sections is being displayed in the display pane, transitioning of the highlight to a second section label of the navigational user interface element corresponding to the second section of the plurality of sections; receiving, from the user via the touchscreen, input corresponding to tapping of the screen at an area associated with a third section label of the navigational interface element; effecting display, in the display pane based on the received input corresponding to tapping of the screen at an area associated with a third section label, of content associated with a third section of the plurality of sections corresponding to the third section label; effecting, at the electronic device, transitioning of the highlight to the third section label of the navigational user interface element; effecting, at the electronic device, updating of the scrollbar interface element to correspond to the portion of the content being displayed in the display pane; receiving, from the user via the touchscreen, input corresponding to pressing and holding on top of the highlight of the navigational user interface element, and dragging of the highlight away from the third section label and towards a fourth section label; displaying, via the touchscreen in response to input corresponding to tapping and holding on top of the highlight of the navigational user interface element, movement of the highlight as the user drags the highlight; receiving, from the user via the touchscreen, input corresponding to release of the press and hold at a position between fourth and fifth section labels that is closer to the fourth section label than the fifth section label; determining, at the electronic device, that the position at which the tap and hold was released is closest to the fourth section label; effecting display, in the display pane based on the determination that the position at which the tap and hold was released is closest to the fourth section label, of content associated with a fourth section of the plurality of sections corresponding to the fourth section label; effecting, at the electronic device, transitioning of the highlight to the fourth section label of the navigational user interface element; and effecting, at the electronic device, updating of the scrollbar interface element to correspond to the portion of the content being displayed in the display pane.

Another aspect relates to a method comprising displaying, to a user via a display associated with an electronic device, a graphical user interface comprising a display pane containing content, the content including a plurality of sections, a scrollbar interface element configured to allow a user to scroll the content displayed in the display pane up and down to view each of the plurality of sections of the content, a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element; determining, at the electronic device, that content corresponding to a first section of the plurality of sections is being displayed in the display pane, effecting, at the electronic device based on the determination that content corresponding to the first section of the plurality of sections is being displayed in the display pane, highlighting of a first section label of the navigational user interface element corresponding to the first section of the plurality of sections; receiving, from the user, input corresponding to scrolling of the content displayed in the display pane using the scrollbar interface element; effecting scrolling, based on the received input corresponding to scrolling of the content displayed in the display pane using the scroll bar interface element, of the content displayed in the display pane; determining, following the scrolling of the content displayed in the display pane, that content corresponding to a second section of the plurality of sections is being displayed in the display pane; effecting, at the electronic device based on the determination that content corresponding to the second section of the plurality of sections is being displayed in the display pane, transitioning of the highlight to a second section label of the navigational user interface element corresponding to the second section of the plurality of sections; receiving, from the user, input corresponding to clicking or tapping of a third section label of the navigational interface element; effecting display, in the display pane based on the received input corresponding to clicking or tapping of the third section label, of content associated with a third section of the plurality of sections corresponding to the third section label; effecting, at the electronic device, transitioning of the highlight to the third section label of the navigational user interface element; effecting, at the electronic device, updating of the scrollbar interface element to correspond to the portion of the content being displayed in the display pane; receiving, from the user, input corresponding to pressing and holding on top of the highlight of the navigational user interface element, and dragging of the highlight away from the third section label and towards a fourth section label; displaying, via the display in response to input corresponding to tapping and holding on top of the highlight of the navigational user interface element, movement of the highlight as the user drags the highlight; receiving, from the user, input corresponding to release of the press and hold at a position between fourth and fifth section labels that is closer to the fourth section label than the fifth section label; determining, at the electronic device, that the position at which the tap and hold was released is closest to the fourth section label; effecting display, in the display pane based on the determination that the position at which the tap and hold was released is closest to the fourth section label, of content associated with a fourth section of the plurality of sections corresponding to the fourth section label; effecting, at the electronic device, transitioning of the highlight to the fourth section label of the navigational user interface element; and effecting, at the electronic device, updating of the scrollbar interface element to correspond to the portion of the content being displayed in the display pane.

Another aspect relates to a method comprising displaying, to a user via a touchscreen associated with an electronic device, a graphical user interface comprising a display pane containing content, the content including a plurality of sections, a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element; determining, at the electronic device, that content corresponding to a first section of the plurality of sections is being displayed in the display pane, effecting, at the electronic device based on the determination that content corresponding to the first section of the plurality of sections is being displayed in the display pane, highlighting of a first section label of the navigational user interface element corresponding to the first section of the plurality of sections; receiving, from the user via the touchscreen, input corresponding to swiping of the screen at an area associated with the display pane; effecting scrolling, based on the received input corresponding to swiping of the screen at an area associated with the display pane, of the content displayed in the display pane; determining, following the scrolling of the content displayed in the display pane, that content corresponding to a second section of the plurality of sections is being displayed in the display pane; effecting, at the electronic device based on the determination that content corresponding to the second section of the plurality of sections is being displayed in the display pane, transitioning of the highlight to a second section label of the navigational user interface element corresponding to the second section of the plurality of sections; receiving, from the user via the touchscreen, input corresponding to pressing and holding on top of the highlight of the navigational user interface element, and dragging of the highlight away from the second section label and towards a third section label; displaying, via the touchscreen in response to input corresponding to tapping and holding on top of the highlight of the navigational user interface element, movement of the highlight as the user drags the highlight; receiving, from the user via the touchscreen, input corresponding to release of the tap and hold at a position between third and fourth section labels that is closer to the third section label than the fourth section label; determining, at the electronic device, that the position at which the tap and hold was released is closest to the third section label; effecting display, in the display pane based on the determination that the position at which the tap and hold was released is closest to the third section label, of content associated with a third section of the plurality of sections corresponding to the third section label; and effecting, at the electronic device, transitioning of the highlight to the third section label of the navigational user interface element.

Another aspect of the present invention relates to a method for navigating within an application comprising the steps of listing in a navigational element available sections of a page in the application, each of the available sections displayed in the navigational element with an associated section label, detecting the selection of one of the section labels, displaying the section of the page associated with the selected section label in an full mode, highlighting the section label associated with the selected section, and scrolling through the page when a click and hold indication of the highlighted section label is detected, wherein as the page is being scrolled through, the relevant section of the page is displayed in view mode.

In a feature of this aspect, the navigational element is a navigation scroller displayed on the page, including the section labels.

In a feature of this aspect, the full mode includes at least allowing a user to edit information in the selected section.

In a feature of this aspect, further comprising detecting the release of the click and hold indication, displaying in full mode the section of the page displayed in view mode at the time the release of the click and hold indication was detected.

Another aspect of the present invention relates to a software application stored on a computer readable medium, the application including computer readable instructions for implementing a method of navigating within the application, the method comprising listing in a navigational element available sections of a page in the application, each of the available sections displayed in the navigational element with an associated section label, detecting the selection of one of the section labels, displaying the section of the page associated with the selected section label in an full mode, highlighting the section label associated with the selected section, and scrolling through the page when a click and hold indication of the highlighted section label is detected, wherein as the page is being scrolled through, the relevant section of the page is displayed in view mode.

In a feature of this aspect, the navigational element is a navigation scroller displayed on the page, including the section labels.

In a feature of this aspect, the full mode includes at least allowing a user to edit information in the selected section.

In a feature of this aspect, the method for navigating further comprises detecting the release of the click and hold indication, displaying in full mode the section of the page displayed in view mode at the time the release of the click and hold indication was detected.

Another aspect of the present invention relates to a method for navigating within an application comprising the steps of selecting one of a plurality of section labels included in a navigation element displayed on a page of the application, each section label associated with a corresponding section of the page, viewing the section of the page associated with the selected label in a full mode, and clicking and holding the selected section label to scroll through the page, wherein as the page is being scrolled through, the relevant section of the page is displayed in view mode.

In a feature of this aspect, the full mode includes at least allowing a user to edit information in the selected section.

In a feature of this aspect, the selected section is highlighted.

In a feature of this aspect, the method further comprises viewing in the full mode the section of the page displayed when the click and hold is released.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 1 illustrates a conventional scroll bar;

FIG. 2 illustrates a navigational user interface element;

FIG. 3 illustrates the display of a section in an edit mode following clicking on a portion of the navigational user interface element of FIG. 2;

FIGS. 5, 6A, 6B, 7A, 7B, 7C, 7D, 7E, 7F, and 7G illustrate an exemplary interface for a touchscreen device in accordance with one or more preferred implementations.

DETAILED DESCRIPTION

Figure 4:
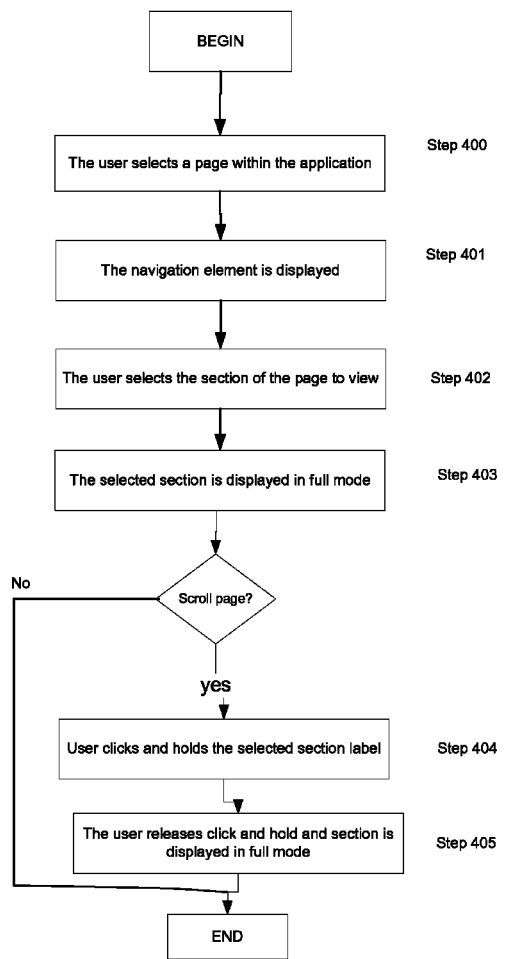
FIG. 4 illustrates a flow diagram of an exemplary method for navigating within an application.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 2 illustrates a navigational user interface element 10 in accordance with a preferred embodiment of the present invention. The navigational user interface element 10 allows a user to scroll or jump to a particular section of a page and expose detailed information for that page all with a single click.

In preferred implementations, such a navigational user interface element 10 lists all the main sections/headers within an associated page equi-distant from one another, as illustrated in FIG. 2. A highlight 12, as illustrated in FIG. 2, indicates which section a user is currently viewing. In one or more preferred implementations, a navigational user interface element 10 is utilized in conjunction with a conventional scroll bar 14, as illustrated in FIG. 2. In FIG. 2, the user has scrolled down to the Medical History section using the conventional scroll bar 14. In FIG. 2, the Medical History section is being displayed in a basic view.

When a user clicks on a particular section/header listing on the user interface element 10, the highlight 12 will go to that section and that section will be displayed. In one or more preferred implementations, upon clicking on that section, the section will open in an edit mode, as opposed to a simple view mode, which exposes all of the controls for that section, as illustrated in FIG. 3.

Preferably, the highlight 12 additionally functions as a traditional scroll bar, in that a user can click on the highlight and then drag it up and down as they would drag a segment of a conventional scroll bar. In some preferred implementations, the navigational user interface element 10 is configured such that, as a user drags the highlight over each section, a preview of that section is provided, either in the main display area the section would eventually be displayed in, or else as a smaller thumbnail preview, although in at least some preferred implementations the navigational user interface element 10 is configured to not provide any such previews. In at least some preferred implementations, the navigational user interface element 10 is configured such that, upon a user clicking on the highlight and dragging it up and/or down, and then releasing it, the highlight 12 snaps to the nearest section/header.

FIG. 4 illustrates a flow diagram of an exemplary method for navigating application content. First, a user might have the option of selecting a specific page or content the user would like to view. Once the user selects a page or content at step 400, a navigation element is displayed (e.g. on a side of the page) listing sections available within the selected page at step 401. The user can select a section using the navigation element that the user wants to navigate to at step 402. The selected section is displayed in a full mode for the user and the selected section label is highlighted at step 403.

If the user wishes to scroll within the page, the user may do so with a scrollbar, or alternatively may utilize the navigation element by clicking and hold the highlighted section label and moving the highlight up or down at step 404. As described hereinabove, in one or more preferred implementations, the navigation element is configured such that, as a user drags the highlight over each section, a preview of that section is provided, either in the main display area the section would eventually be displayed in, or else as a smaller thumbnail preview, although in at least some preferred implementations the navigation element is configured to not provide any such previews. When the user releases the click and hold, the section of the page closest to the currently displayed portion is displayed in a full mode and the associated section label is highlighted at step 405.

Further, although illustrated herein disposed generally proximate a left of the screen in a vertical orientation, in at least some preferred implementations the scroll bar may be disposed elsewhere on the screen and in other orientations, such as, for example, proximate a right side of a screen in a vertical orientation or proximate a top or bottom of a screen in a horizontal orientation.

In one or more preferred implementations a navigational user interface element is configured for use with a mouse and keyboard, a touchscreen, and/or a stylus.

For example, FIG. 5 illustrates an exemplary interface for a touchscreen device in accordance with one or more preferred implementations. The interface includes a navigational interface element disposed on a left side of the interface that is configured to display a listing of sections of content, indicate to a user via a highlight which section is currently being viewed, and allow a user to navigate to different sections of content, such as the displayed Medical History section, which is abbreviated as "Hx" in the section listing of the navigational interface element.

As described hereinabove, a user can utilize the navigational interface element to effect navigation to one of the listed sections by "clicking" (in this case, tapping) on a listed section, which causes the highlight to go to that section and causes that section to be displayed in a display pane on a right side of the interface.

Figure 6A:
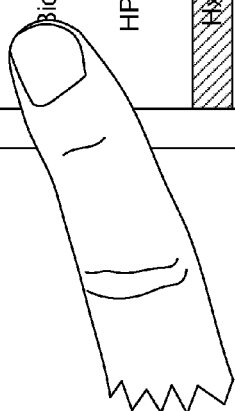
Figure 6B:
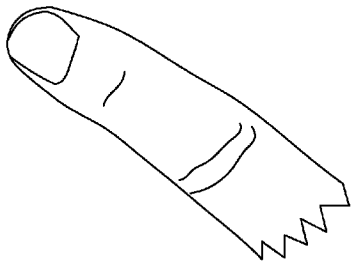

FIGS. 6A-6B illustrate this process whereby a user taps the "Bio" section label of the navigational interface element to effect navigation to the associated "Biographical Information" section.

Figure 7A:
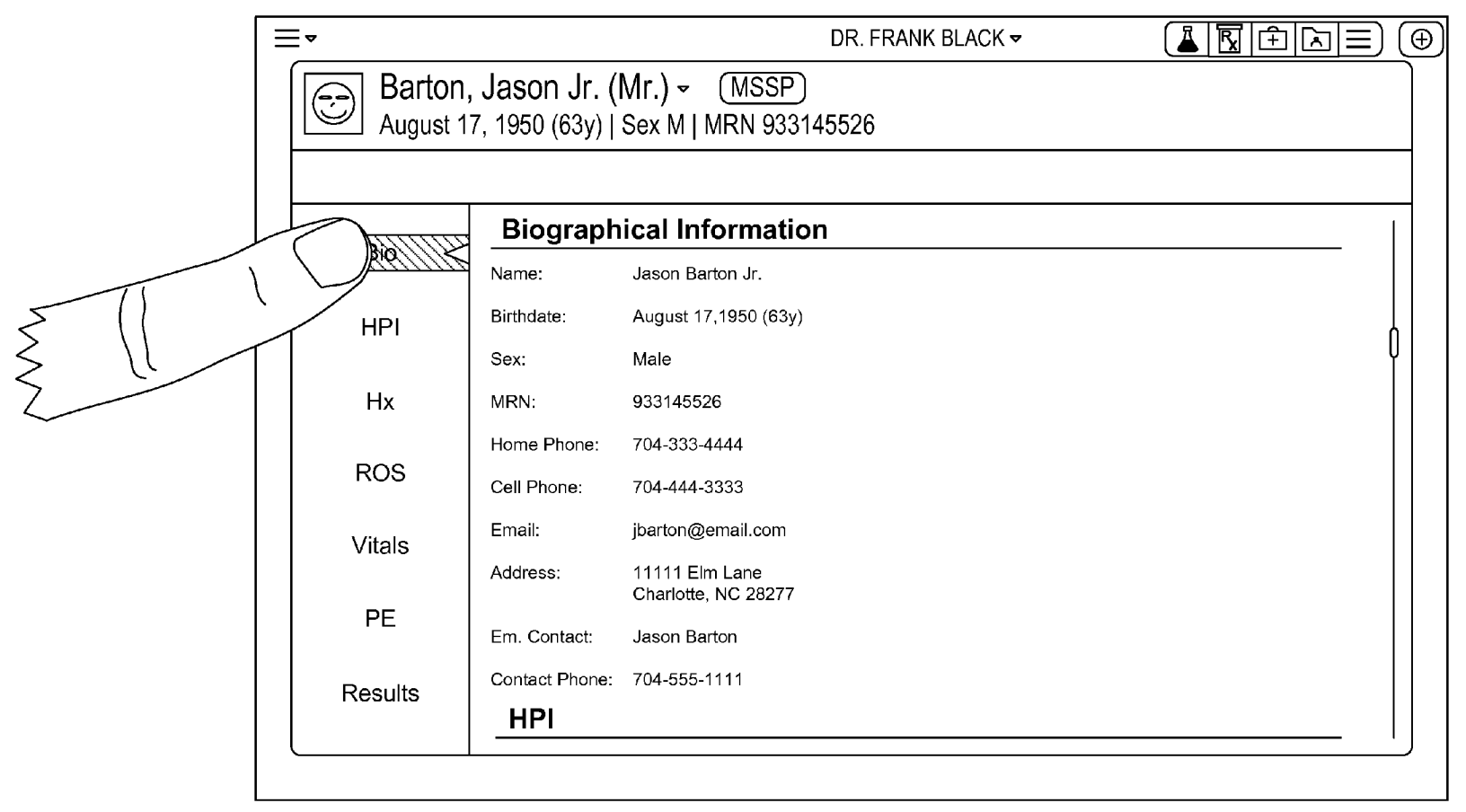
Figure 7B:
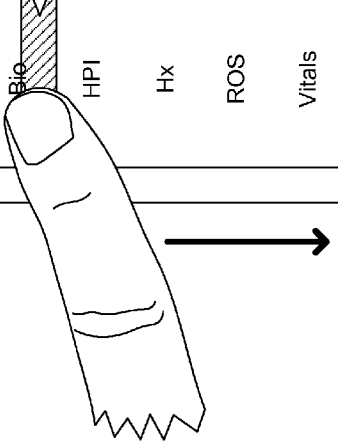
Figure 7C:
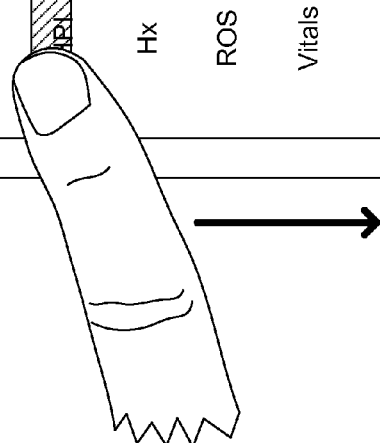
Figure 7D:
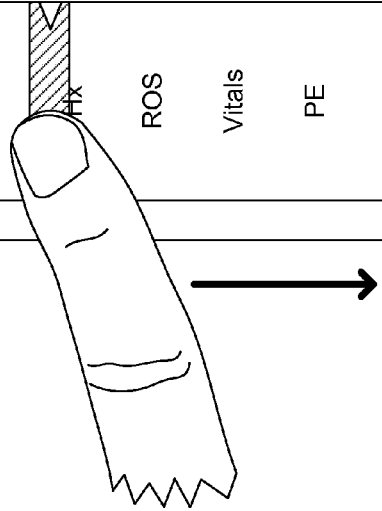
Figure 7E:
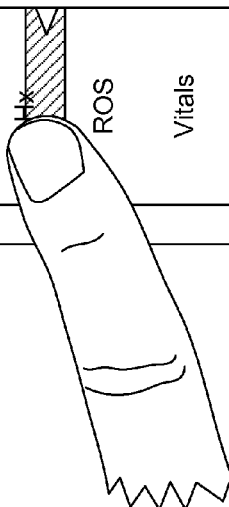
Figure 7F:
Figure 7G:
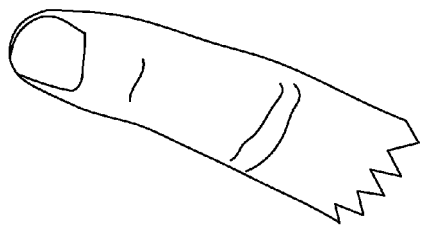

As also described hereinabove, a user can click (or in this case, tap) on the highlight and then drag it up and down as they would drag a segment of a conventional scroll bar, as illustrated in FIGS. 7A-7D. As still further described hereinabove, when the user releases his or her click and hold (or in this case, lifts his or her finger), the section of the page closest to the currently displayed portion is displayed and the associated section label is highlighted. That is, upon release the highlight snaps to the closest section label and the associated section is displayed in the display pane, as illustrated in FIGS. 7E-7G.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method comprising:
   (a) displaying, to a user via a touchscreen associated with an electronic device, a graphical user interface comprising
      (i) a display pane containing content, the content including a plurality of sections,
      (ii) a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element;
   (b) determining, at the electronic device, that content corresponding to a first section of the plurality of sections is being displayed in the display pane,
   (c) effecting, at the electronic device based on the determination that content corresponding to the first section of the plurality of sections is being displayed in the display pane, highlighting of a first section label of the navigational user interface element corresponding to the first section of the plurality of sections;
   (d) receiving, from the user via the touchscreen, input corresponding to swiping of the screen at an area associated with the display pane;
   (e) effecting scrolling, based on the received input corresponding to swiping of the screen at an area associated with the display pane, of the content displayed in the display pane;
   (f) determining, following the scrolling of the content displayed in the display pane, that content corresponding to a second section of the plurality of sections is being displayed in the display pane;
   (g) effecting, at the electronic device based on the determination that content corresponding to the second section of the plurality of sections is being displayed in the display pane, transitioning of the highlight to a second section label of the navigational user interface element corresponding to the second section of the plurality of sections;
   (h) receiving, from the user via the touchscreen, input corresponding to tapping of the screen at an area associated with a third section label of the navigational interface element;
   (i) effecting display, in the display pane based on the received input corresponding to tapping of the screen at an area associated with a third section label, of content associated with a third section of the plurality of sections corresponding to the third section label;
   (j) effecting, at the electronic device, transitioning of the highlight to the third section label of the navigational user interface element;
   (k) receiving, from the user via the touchscreen, input corresponding to pressing and holding on top of the highlight of the navigational user interface element, and dragging of the highlight away from the third section label and towards a fourth section label;
   (l) displaying, via the touchscreen in response to input corresponding to tapping and holding on top of the highlight of the navigational user interface element, movement of the highlight as the user drags the highlight;
   (m) receiving, from the user via the touchscreen, input corresponding to release of the press and hold at a position between fourth and fifth section labels that is closer to the fourth section label than the fifth section label;
   (n) determining, at the electronic device, that the position at which the tap and hold was released is closest to the fourth section label;
   (o) effecting display, in the display pane based on the determination that the position at which the tap and hold was released is closest to the fourth section label, of content associated with a fourth section of the plurality of sections corresponding to the fourth section label;
   (p) effecting, at the electronic device, transitioning of the highlight to the fourth section label of the navigational user interface element.

2. The method of claim 1, wherein the electronic device comprises a tablet computer.

3. The method of claim 1, wherein the touchscreen comprises a touchscreen monitor.

4. The method of claim 1, wherein the electronic device comprises a smartphone.

5. The method of claim 1, wherein the electronic device comprises a laptop.

6. The method of claim 1, wherein the electronic device comprises a phone.

7. The method of claim 1, wherein the electronic device comprises a desktop computer.

8. The method of claim 1, wherein the electronic device comprises a workstation.

9. The method of claim 1, wherein the content comprises medical data.

10. The method of claim 1, wherein the content comprises patient medical data.

11. The method of claim 1, wherein the first section and the third section are the same section.

12. The method of claim 1, wherein the first section and the third section are different sections.

13. The method of claim 1, wherein the second section and the fourth section are the same section.

14. The method of claim 1, wherein the second section and the fourth section are different sections.

15. The method of claim 1, wherein the first section and the fourth section are the same section.

16. The method of claim 1, wherein the first section label and the fifth section label are the same section label.

17. The method of claim 1, wherein one or more of the first section label, second section label, third section label, fourth section label, and fifth section label refer to the same section label.

18. The method of claim 1, wherein the first section label, second section label, third section label, fourth sectional label, and fifth section label all refer to different section labels.

19. A method comprising:
(a) displaying, to a user via a touchscreen associated with an electronic device, a graphical user interface comprising
 (i) a display pane containing content, the content including a plurality of sections,
 (ii) a scrollbar interface element configured to allow a user to scroll the content displayed in the display pane up and down to view each of the plurality of sections of the content,
 (iii) a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element;
(b) determining, at the electronic device, that content corresponding to a first section of the plurality of sections is being displayed in the display pane,
(c) effecting, at the electronic device based on the determination that content corresponding to the first section of the plurality of sections is being displayed in the display pane, highlighting of a first section label of the navigational user interface element corresponding to the first section of the plurality of sections;
(d) receiving, from the user via the touchscreen, input corresponding to scrolling of the content displayed in the display pane;
(e) effecting scrolling, based on the received input corresponding to scrolling of the content displayed in the display pane, of the content displayed in the display pane;
(f) determining, following the scrolling of the content displayed in the display pane, that content corresponding to a second section of the plurality of sections is being displayed in the display pane;
(g) effecting, at the electronic device based on the determination that content corresponding to the second section of the plurality of sections is being displayed in the display pane, transitioning of the highlight to a second section label of the navigational user interface element corresponding to the second section of the plurality of sections;
(h) receiving, from the user via the touchscreen, input corresponding to tapping of the screen at an area associated with a third section label of the navigational interface element;
(i) effecting display, III the display pane based on the received input corresponding to tapping of the screen at an area associated with a third section label, of content associated with a third section of the plurality of sections corresponding to the third section label;
(j) effecting, at the electronic device, transitioning of the highlight to the third section label of the navigational user interface element;
(k) effecting, at the electronic device, updating of the scrollbar interface element to correspond to the portion of the content being displayed in the display pane;
(l) receiving, from the user via the touchscreen, input corresponding to pressing and holding on top of the highlight of the navigational user interface element, and dragging of the highlight away from the third section label and towards a fourth section label;
(m) displaying, via the touchscreen in response to input corresponding to tapping and holding on top of the highlight of the navigational user interface element, movement of the highlight as the user drags the highlight;
(n) receiving, from the user via the touchscreen, input corresponding to release of the press and hold at a position between fourth and fifth section labels that is closer to the fourth section label than the fifth section label;
(o) determining, at the electronic device, that the position at which the tap and hold was released is closest to the fourth section label;
(p) effecting display, in the display pane based on the determination that the position at which the tap and hold was released is closest to the fourth section label, of content associated with a fourth section of the plurality of sections corresponding to the fourth section label;
(q) effecting, at the electronic device, transitioning of the highlight to the fourth section label of the navigational user interface element; and
(r) effecting, at the electronic device, updating of the scrollbar interface element to correspond to the portion of the content being displayed in the display pane.

20. A method comprising:
(a) displaying, to a user via a display associated with an electronic device, a graphical user interface comprising
 (i) a display pane containing content, the content including a plurality of sections,
 (ii) a scrollbar interface element configured to allow a user to scroll the content displayed in the display pane up and down to view each of the plurality of sections of the content,
 (iii) a navigational user interface element containing a plurality of section labels, each section label corresponding to one of the plurality of sections of the content, the navigational user interface element including a highlight configured to indicate a displayed section of the plurality of sections that is being displayed in the display pane by highlighting the corresponding section label of the navigational user interface element;
(b) determining, at the electronic device, that content corresponding to a first section of the plurality of sections is being displayed in the display pane;
(c) of the plurality of sections is being displayed in the display pane, effecting, at the electronic device based on the determination that content corresponding to the first section of the plurality of sections is being displayed in the display pane, highlighting of a first section label of the navigational user interface element corresponding to the first section of the plurality of sections;
(d) receiving, from the user, input corresponding to scrolling of the content displayed in the display pane using the scrollbar interface element;
(e) effecting scrolling, based on the received input corresponding to scrolling of the content displayed in the display pane using the scroll bar interface element, of the content displayed in the display pane;
(f) determining, following the scrolling of the content displayed in the display pane, that content corresponding to a second section of the plurality of sections is being displayed in the display pane;
(g) effecting, at the electronic device based on the determination that content corresponding to the second section of the plurality of sections is being displayed in the display pane, transitioning of the highlight to a second section label of the navigational user interface element corresponding to the second section of the plurality of sections;

(h) receiving, from the user, input corresponding to clicking or tapping of a third section label of the navigational interface element;

(i) effecting display, in the display pane based on the received input corresponding to clicking or tapping of the third section label, of content associated with a third section of the plurality of sections corresponding to the third section label;

(j) effecting, at the electronic device, transitioning of the highlight to the third section label of the navigational user interface element;

(k) effecting, at the electronic device, updating of the scrollbar interface element to correspond to the portion of the content being displayed in the display pane;

(l) receiving, from the user, input corresponding to pressing and holding on top of the highlight of the navigational user interface element, and dragging of the highlight away from the third section label and towards a fourth section label;

(m) displaying, via the display in response to input corresponding to tapping and holding on top of the highlight of the navigational user interface element, movement of the highlight as the user drags the highlight;

(n) receiving, from the user, input corresponding to release of the press and hold at a position between fourth and fifth section labels that is closer to the fourth section label than the fifth section label;

(o) determining, at the electronic device, that the position at which the tap and hold was released is closest to the fourth section label;

(p) effecting display, in the display pane based on the determination that the position at which the tap and hold was released is closest to the fourth section label, of content associated with a fourth section of the plurality of sections corresponding to the fourth section label;

(q) effecting, at the electronic device, transitioning of the highlight to the fourth section label of the navigational user interface element; and (r) effecting, at the electronic device, updating of the scrollbar interface element to correspond to the portion of the content being displayed in the display pane.

* * * * *

UNITED STATES PATENT AND TRADEMARK OFFICE
CERTIFICATE OF CORRECTION

| | | |
|---|---|---|
| PATENT NO. | : 9,141,270 B1 | Page 1 of 1 |
| APPLICATION NO. | : 13/972615 | |
| DATED | : September 22, 2015 | |
| INVENTOR(S) | : Anthony Edward Stuart and Leigh Randal McClure | |

It is certified that error appears in the above-identified patent and that said Letters Patent is hereby corrected as shown below:

Title Page

Item (73) Assignee:

"ALLSCIPTS SOFTWARE, LLC" is deleted and replaced with --ALLSCRIPTS SOFTWARE, LLC--

Signed and Sealed this
Second Day of February, 2016

Michelle K. Lee
*Director of the United States Patent and Trademark Office*